(12) United States Patent
Chen

(10) Patent No.: US 11,154,036 B1
(45) Date of Patent: Oct. 26, 2021

(54) ANIMAL GARMENT WITH IMPROVISED HUMAN-LIKE HUGGING SENSATION

(71) Applicant: Wenzhou Midali Pet Product Co. Ltd., Metuchen, NJ (US)

(72) Inventor: Dingzhang Chen, Wenzhou (CN)

(*) Notice: Subject to any disclaimer, the term of this patent is extended or adjusted under 35 U.S.C. 154(b) by 0 days.

(21) Appl. No.: 17/214,783

(22) Filed: Mar. 26, 2021

(30) Foreign Application Priority Data

Sep. 30, 2020 (CN) .......................... 202011059680.6

(51) Int. Cl.
*A01K 13/00* (2006.01)
(52) U.S. Cl.
CPC .................................. *A01K 13/006* (2013.01)
(58) Field of Classification Search
CPC .. A01K 13/006; A01K 13/008; A01K 27/002; A01K 27/008
See application file for complete search history.

(56) References Cited

U.S. PATENT DOCUMENTS

| | | | | |
|---|---|---|---|---|
| 5,632,235 | A * | 5/1997 | Larsen | A01K 27/002 119/856 |
| 6,662,754 | B1 * | 12/2003 | Wilson | A01K 13/006 119/850 |
| 6,877,300 | B1 * | 4/2005 | Hathcock | A01K 13/008 54/79.2 |
| 7,637,087 | B1 * | 12/2009 | Graham | A01K 13/008 54/79.1 |
| 8,459,211 | B2 | 6/2013 | Blizzard | |
| 2005/0284418 | A1 * | 12/2005 | Benefiel | A01K 13/006 119/850 |
| 2006/0090711 | A1 * | 5/2006 | Richards | A01K 13/006 119/850 |
| 2006/0101792 | A1 * | 5/2006 | Chang | A01K 13/006 54/79.1 |
| 2013/0186348 | A1 * | 7/2013 | Blizzard | A61D 9/00 119/850 |
| 2014/0174381 | A1 * | 6/2014 | Cozzolino | A63B 21/068 119/863 |
| 2018/0055009 | A1 * | 3/2018 | Wyatt | A01K 15/021 |
| 2018/0263217 | A1 * | 9/2018 | Harris | A44B 18/0069 |
| 2019/0200573 | A1 * | 7/2019 | Smith | A01K 13/006 |

* cited by examiner

*Primary Examiner* — Trinh T Nguyen
(74) *Attorney, Agent, or Firm* — Heng Wang, Esq.; Wang, Gao & Associates, P.C.

(57) ABSTRACT

This animal garment can be used on any animal that has a neck, two pairs of appendages, and a mid-body between the two pairs of appendages. The garment traverses the animal's neck and its mid-body. It has a pair of straps and a pair of flaps that are fastened securely by hook-and-loop fasteners in a way that creates constant pressure on the animal. More specifically, when the garment is worn by the animal, a pair of straps extends around the animal's neck. This pair of straps, extending from opposite sides of the central portion of the garment, connects through an object with a hole in it, such as a ring-shaped object. The object serves as the point of reversal for each strap, and the point where each strap doubles back after passing through the aforementioned hole, and becomes fastened and secured in place. The remaining portion of the garment has two flaps extending from opposite sides of the central portion of the garment, which extend around, and conform to, the outside of the mid-body of the animal. Once the garment is securely fastened on the animal, the animal will feel secure, and will feel as if a human is holding it.

2 Claims, 7 Drawing Sheets

ANIMAL GARMENT WITH IMPROVISED HUMAN-LIKE HUGGING SENSATION

CROSS-REFERENCE TO RELATED APPLICATIONS

This application claims priority from China Patent Application Serial Number 202011059680.6, which was filed on Sep. 30, 2020, the entire content of which is incorporated herein by reference.

BACKGROUND OF THE INVENTION

Animals, including, but not limited to, dogs and cats, are frequently sensitive to stress producing situations such as traveling, meeting new people, thunderstorms, and heavy rains. They may experience fearfulness, anxiety or other similar negative feelings during these high-stress situations. In order to remedy these situations, animal owners would hold or swaddle the animal in their arms to make it feel attended to and secure.

Considering that an animal owner cannot always be present with the animal during these fear-provoking situations, the applicant for this patent has designed an animal garment which provides the animals with an improvised human-like hugging sensation. When it is worn by the animal, it applies gentle and constant pressure on the animal so that the animal believes it is being hugged by a human, thus relieving its anxiety and stress during these stressful situations.

SUMMARY OF THE INVENTION

The invention contemplates an animal garment with a pair of straps and a pair of flaps, extending around the animal's neck and mid-body, respectively, when the garment is worn by the animal. Through the use of hook-and-loop fasteners, these flaps and straps are fastened and secured, creating constant pressure on the animal. Each pair of flaps/straps extends laterally from opposite sides of the central portion of the garment. When the garment is worn by the animal, each strap passes through a hole in an object serving as the point of reversal, doubles back, and then rests across the animal's neck. The pair of the flaps, which extends laterally from opposite sides of the central portion of the garment at different lateral levels, crosses each other, and rests across the outside of the pet's mid-body. When the garment is worn by the animal, the pair of flaps, together with the central portion of the garment, forms a shape conforming to the outside of the animal's mid-body. These flaps and straps can be fastened and secured by the hook-and-loop fasteners, creating constant pressure on the animal.

As explained in more details below, the aforementioned straps and flaps are secured in place by hook-and-loop fasteners when the garment is worn by the animal. Upon an examination of the garment, it would become clear to an observer that the pressure exerted on the animal through the secured flaps/straps delivers the intended effect of improvising and simulating a human being's embrace.

BRIEF DESCRIPTION OF THE DRAWINGS

The following is a brief description of the drawings.

DETAILED DESCRIPTION OF INVENTION

This is an animal garment 100 with a pair of straps 110, 115 and a pair of flaps 120, 125 that, when worn by an animal, extend around the animal's neck and midbody, respectively. Due to the fastening mechanism used in the design, these straps 110, 115 and flaps 120, 125 are fastened securely in a way that creates a "squeezing" sensation for the animal.

Figure 1:
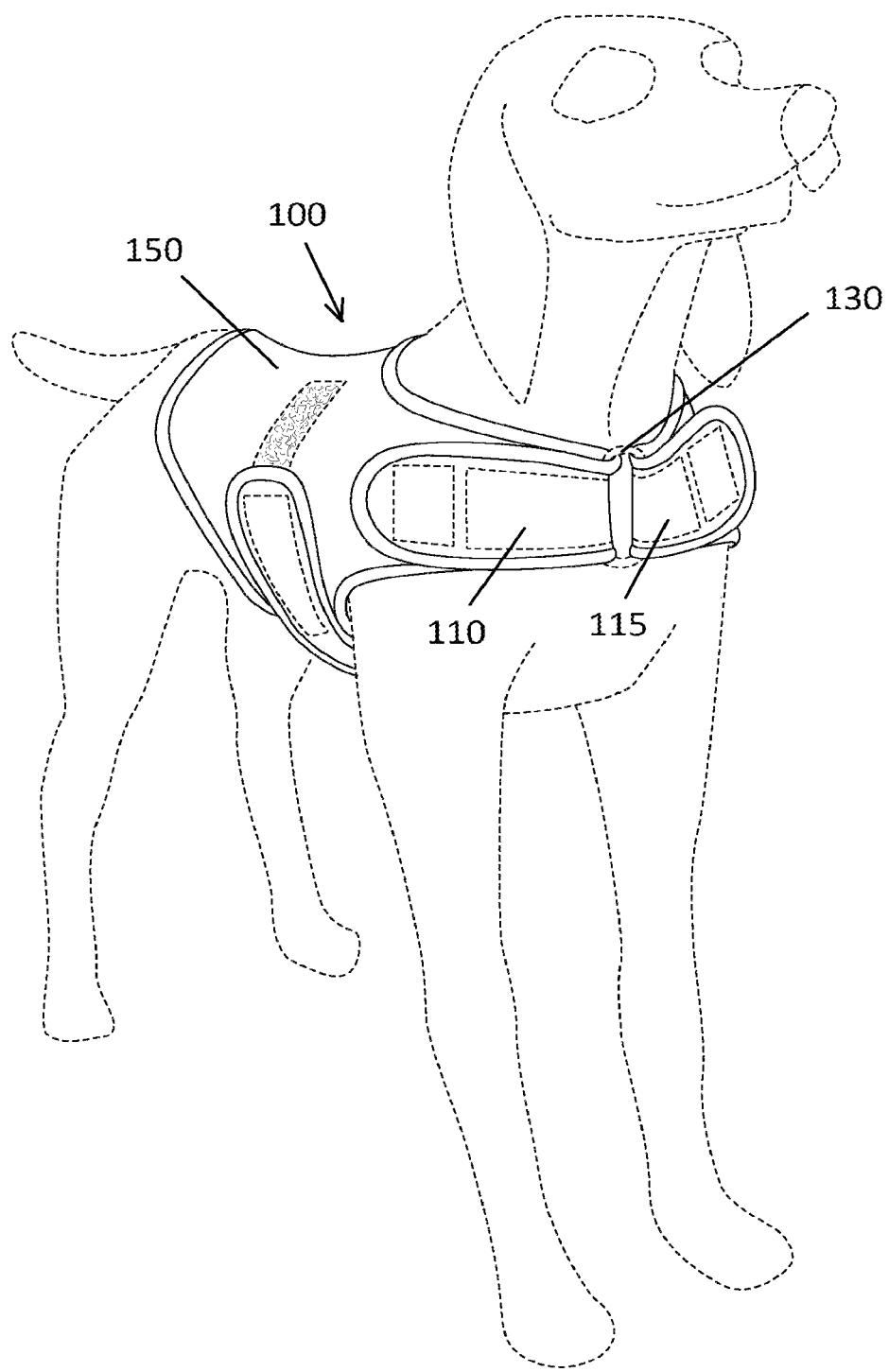
FIG. 1 is a perspective view of the animal garment securely fastened on the entirety of the body of an exemplary animal.
Figure 2:
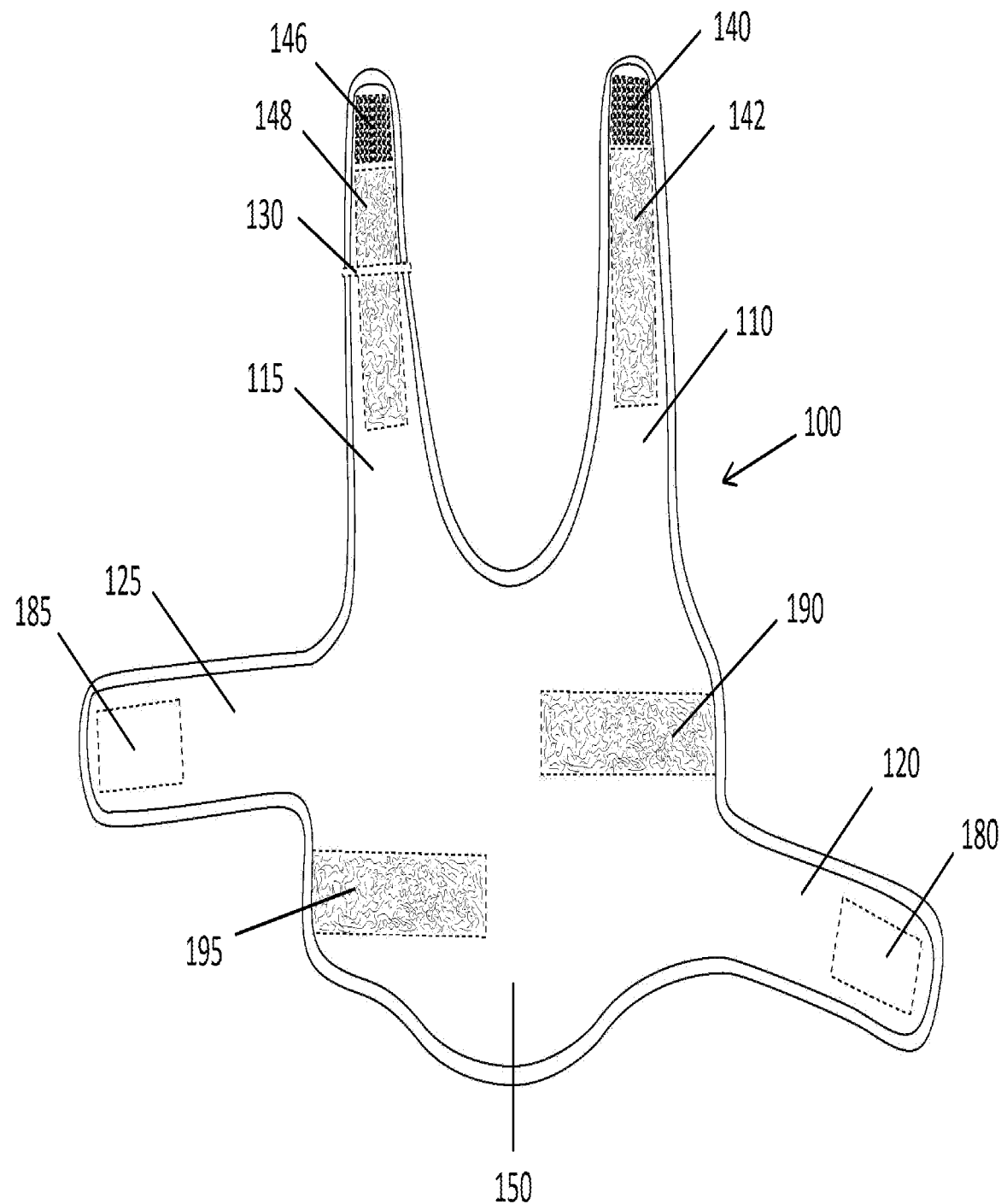
FIG. 2 is a two-dimensional top plan view of the animal garment.
Figure 3:
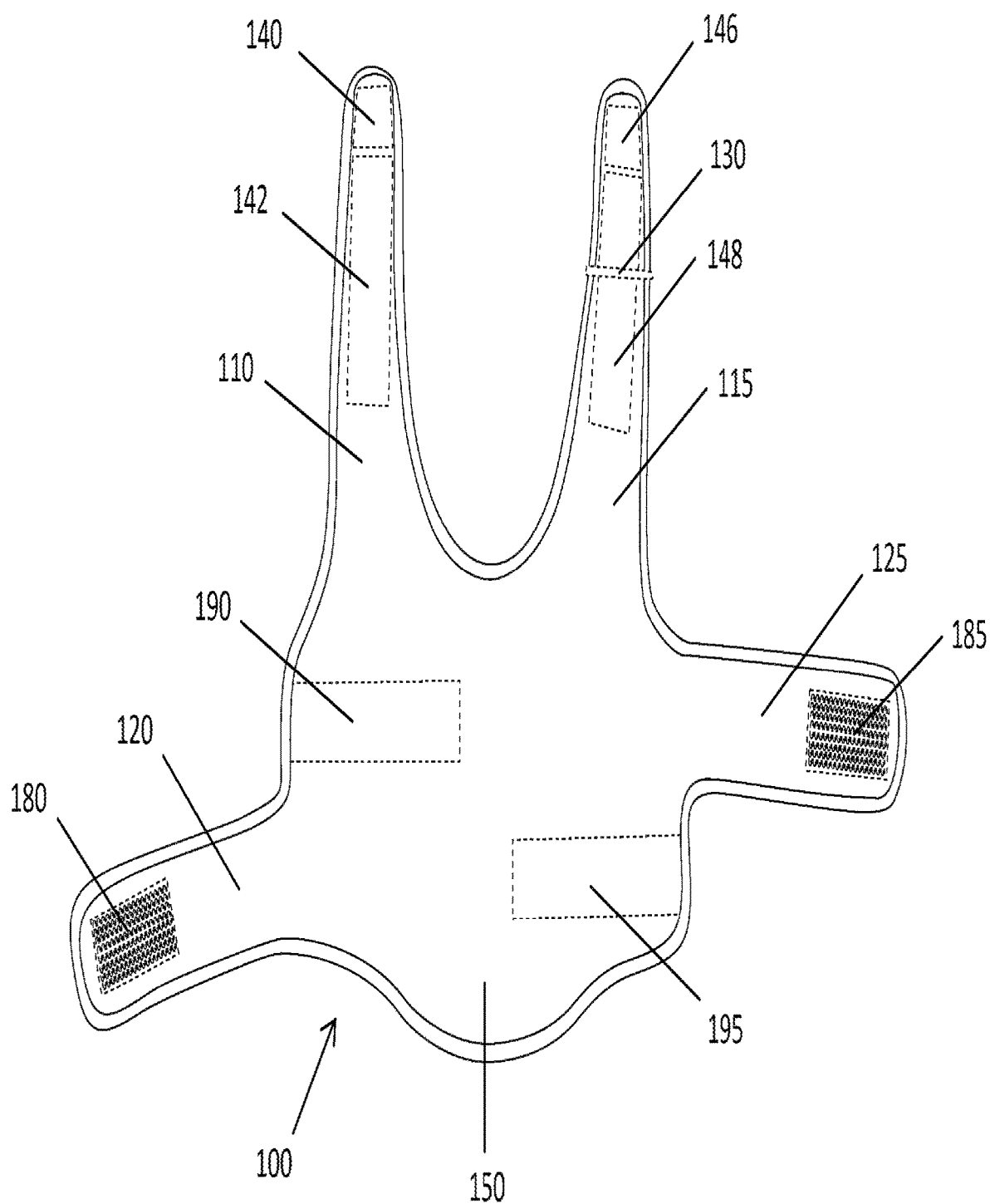
FIG. 3 is a two-dimensional bottom plan view of the animal garment.
Figure 4:
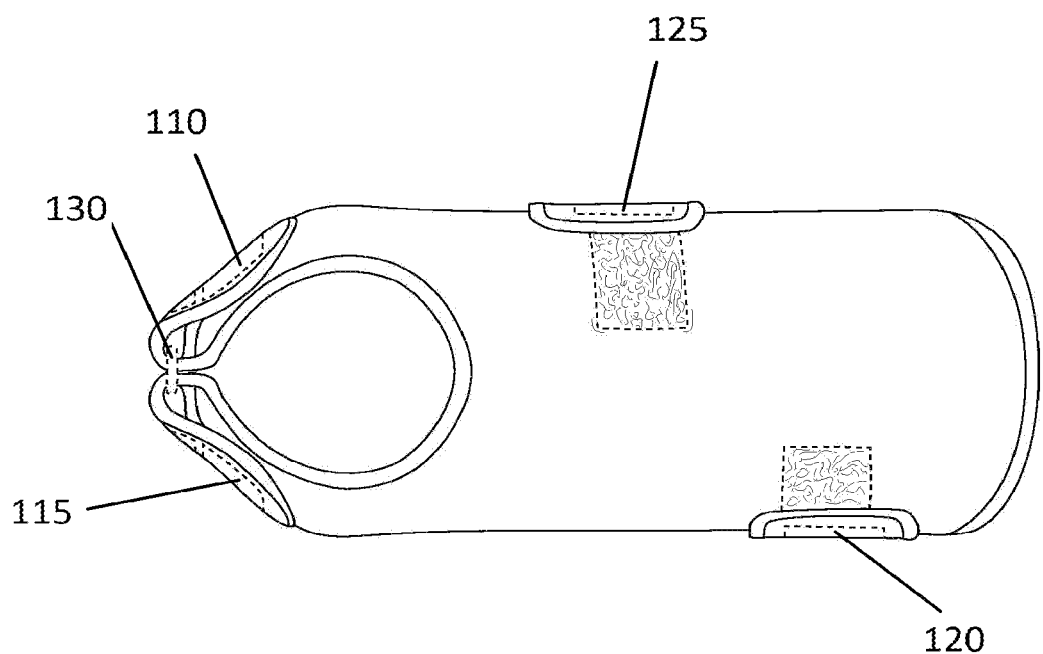
FIG. 4 is a three-dimensional top plan view of the animal garment when worn by the animal.
Figure 5:
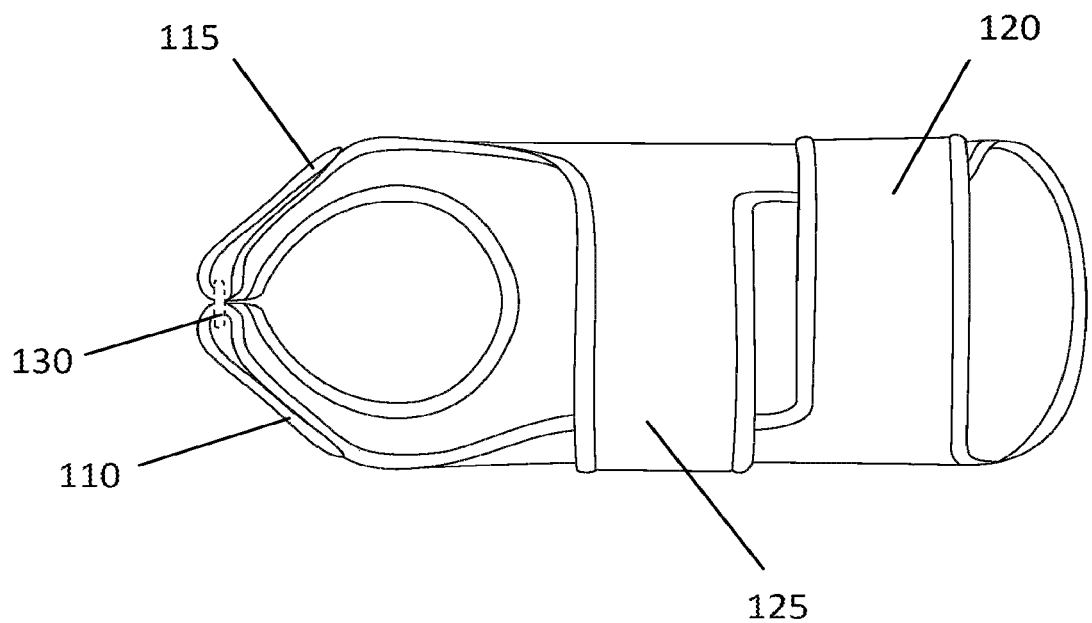
FIG. 5 is a three-dimensional bottom plan view of the animal garment when worn by the animal.
Figure 6:
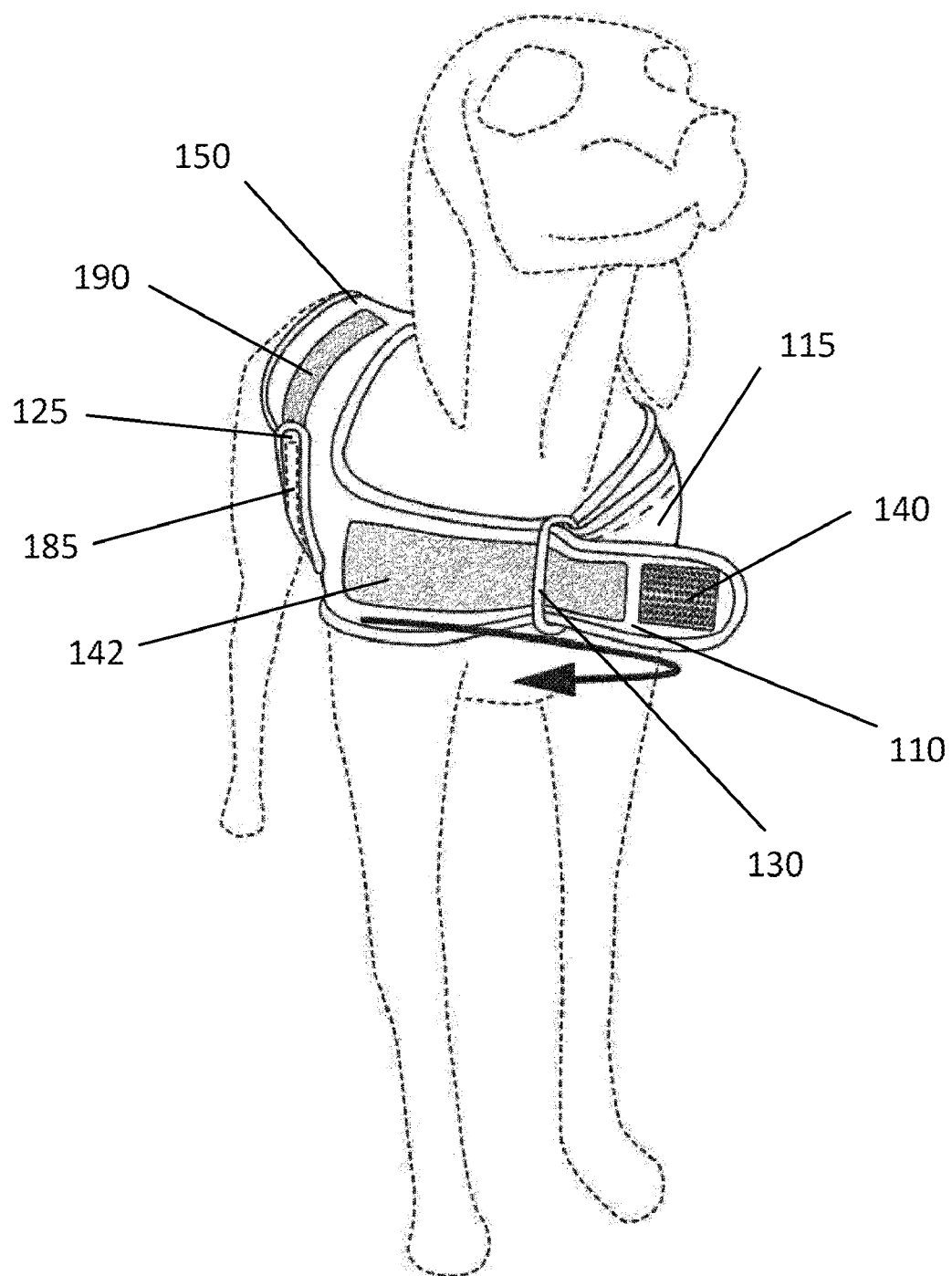
FIG. 6 is a perspective view of the animal garment as worn by an exemplary animal, showing how the front portion of a strap passes through an object with a hole that serves as the point of reversal and doubling back, and then is fastened to the other portion of the flap.

This animal garment 100 traverses the animal's neck and mid-body. First, a pair of straps 110, 115 extending laterally from opposite sides of the garment connects through an object that has a hole in it 130, such as a ring-shaped object, serving as the point of reversal. As can be seen in FIG. 1 and FIG. 6, the front of each of these straps 110, 115 flows through the aforementioned hole initially in one direction, flips back in reverse direction, and eventually becomes fastened to the beginning portion of the strap via hook-and-loop fasteners.

The garment also extends around the animal's mid-body. More specifically, a pair of flaps 120, 125, extending laterally from opposite sides of the central portion 150 of the garment, at different lateral levels as indicated in FIG. 2, FIG. 3, FIG. 4, and FIG. 5, extends around, and conforms to, the outside of the mid-body of the animal. Each of these flaps 120, 125 is fastened and secured via hook-and-loop fasteners on the inside surface 180, 185 of the flap and the outside surface 190, 195 of the central portion 150 of the garment, respectively. Because the two flaps are at different lateral levels as indicated in FIG. 2, FIG. 3, FIG. 4, and FIG. 5, they rest on, and wrap across different cross portions of the animal's body. Thus, these two flaps 120, 125 do not fasten onto each other. In fact, they miss each other in the sense that they do not lay in the same final resting position. In the end, one flap will be closer to the animal's neck than the other flap because they are at different lateral levels.

Figure 7:
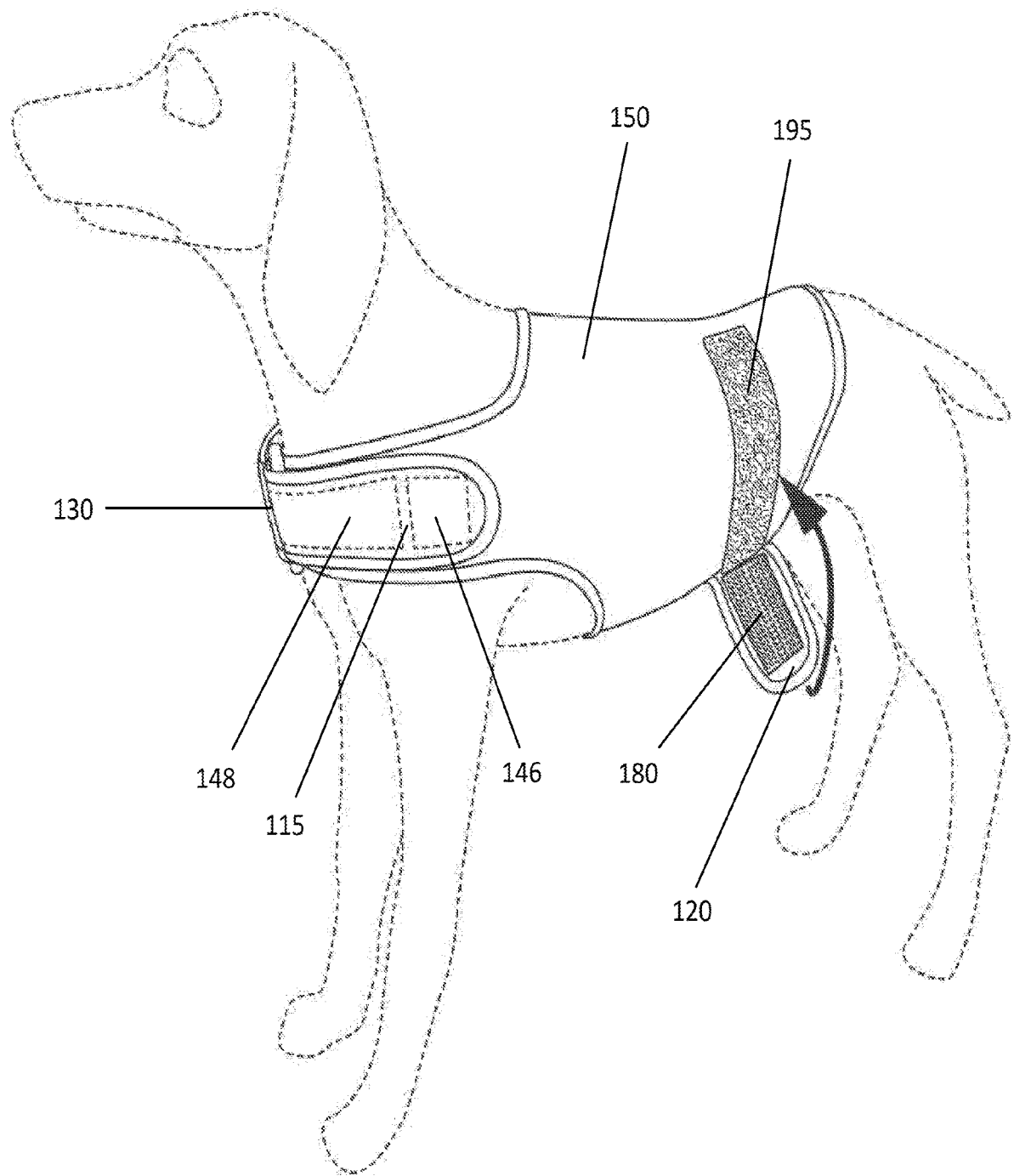
FIG. 7 is a perspective view of the animal garment as worn by an exemplary animal, showing how the flaps becomes securely fastened through hook-and-loop fasteners in an upward-trending motion.

As demonstrated in FIGS. 6-7, each flap 120, 125 lays across the animal's mid-body and then becomes securely fastened through hook-and-loop fasteners in an upward-trending motion.

As demonstrated above, the proper way of putting the garment on the animal is to do it tightly enough so as to create the impression of a warm embrace from a human being. Nevertheless, the flaps/straps can be fastened with as much or as little force and strength as the animal owner desires, thereby customizing the effect on the animal.

The invention claimed is:
1. A garment for an animal, comprising:
a central portion that has a longitudinal axis;

a first strap, including both a hook section of fastener and a loop section of fastener on the same surface, extending laterally in a first direction from the longitudinal axis of the central portion;

a second strap, including both a hook section of fastener and a loop section of fastener on the same surface, extending laterally in a second direction, which is the opposite direction of the first direction, from the longitudinal axis of the central portion;

an object with a hole therein;

wherein when the garment is worn by the animal, each strap passes through the hole in the object, and then doubles back so that the hook section of fastener and the loop section of fastener on the strap fasten to each other, thereby securing the strap in place, and wherein when the garment is worn by the animal, these two straps, connected by the object with a hole, extend around the animal's neck.

2. A garment for an animal, comprising:

a central portion having a longitudinal axis;

a first flap, extending laterally in a first direction from the longitudinal axis of the central portion, and including one of hook fasteners or loop fasteners on its inside surface, which may fasten to a first section of the other of hook fasteners or loop fasteners on the outside surface of the central portion;

a second flap, extending laterally at a different lateral level in a second direction, which is the opposite direction of the first direction, from the longitudinal axis of the central portion, and including one of hook fasteners or loop fasteners on its inside surface, which is configured to fasten to a second section of the other hook fasteners or loop fasteners on the outside surface of the central portion;

the first flap and the first section of fasteners on the outside surface of the central portion are substantially at the same lateral level;

the second flap and the second section of fasteners on the outside surface of the central portion are substantially at the same lateral level;

wherein when the garment is worn by the animal, the first flap and the second flap wrap around different cross portions of the animal's mid-body, and do not overlap, and wherein when the garment is worn by the animal, the first flap, the second flap, and the central portion extend around, and conform to, the outside of the animal's mid-body.

* * * * *